United States Patent Office 2,795,073
Patented June 11, 1957

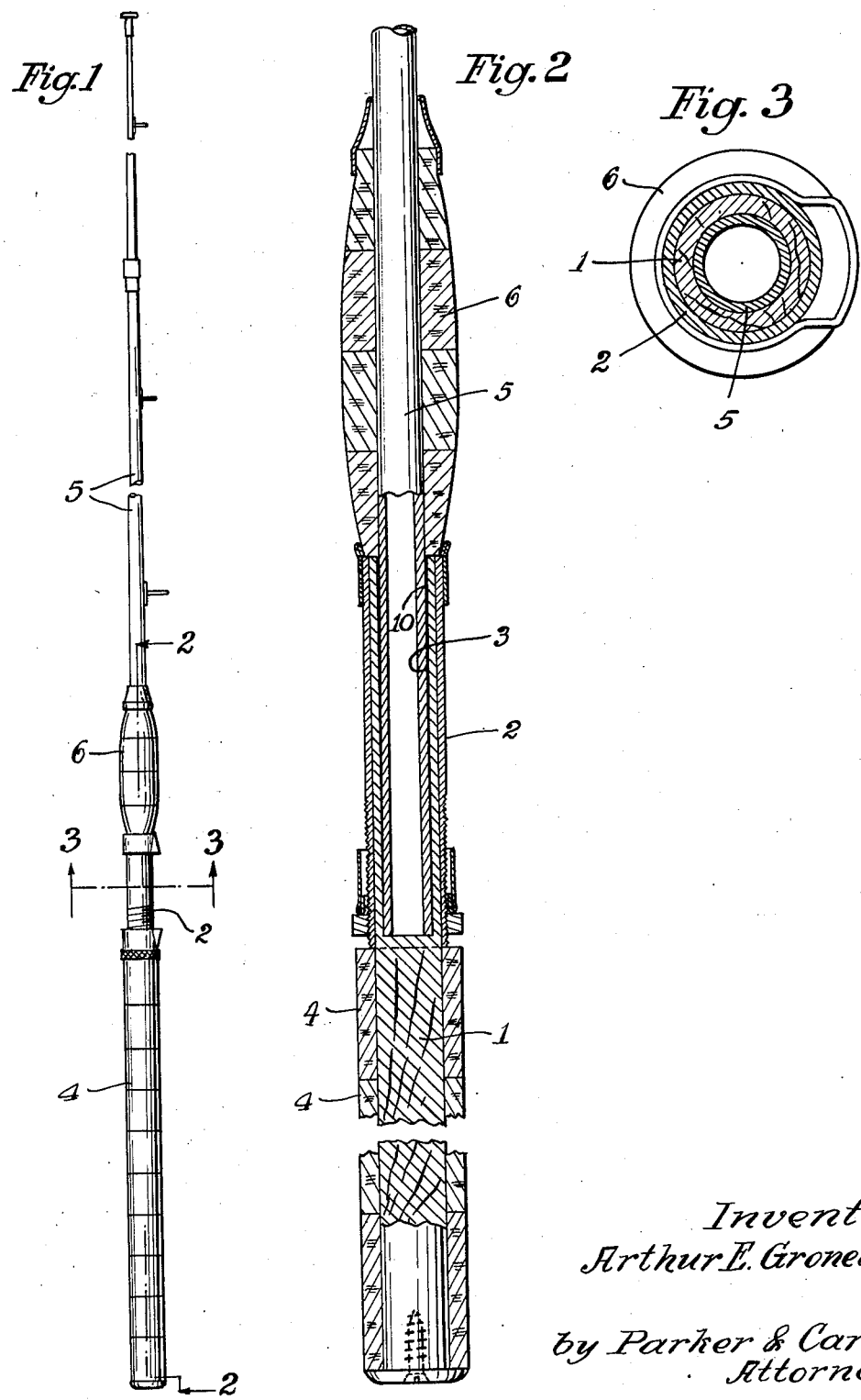

2,795,073

FISHING ROD

Arthur E. Gronewold, Chicago, Ill., assignor to Richardson Rod & Reel Company, Chicago, Ill., a corporation of Illinois Application August 25, 1955, Serial No. 530,516

3 Claims. (Cl. 43—23)

My invention relates to improvements in fishing rods and has for one object to provide a new and improved form of fishing rod wherein the handle portion is exceedingly stiff and rigid and wherein the blade portion projecting from the handle is especially flexible and resilient. By this arrangement I provide a soft cork grip which is warm on cold days when fishing in cold water and is not slippery, all associated with a rigid stiff handle which is a poor heat conductor but has the necessary flexibility.

Another object of my invention is to provide a rod having a stiff, rigid handle and a relatively flexible blade which can be easily and accurately manufactured.

Other objects of the invention will appear from time to time throughout the specification and claims.

My invention is illustrated more or less diagrammatically in the accompanying drawings, wherein—

Figure 1 is a side elevation of the rod;

Figure 2 is a longitudinal section along the line 2—2 of Figure 1;

Figure 3 is a transverse section along the line 3—3 of Figure 1.

Like parts are indicated by like characters throughout the specification and drawings.

1 is a relatively short, stiff handle core. It is preferably made of wood though it might be made of other suitable material such as steel, aluminum or the like. The handle core is cylindrical, exteriorly smooth and of uniform outside diameter from end to end for ease of assembly of the handle.

2 is a reel base, preferably of metal, cylindrical and closely encircling and reinforcing the forward end of the handle core 1. The handle core at the forward end is cylindrically counterbored at 3. The counterbore is concentric with the core and open toward the forward end of the core. The depth of the counterbore is generally the same as the length of the reel base so the cylindrical reel base encircling the core reinforces the counterbored portion thereof.

4 is the rod handle, preferably made up of a plurality of rings of cork, or other suitable material, which are threaded on the stiff handle core, cemented or otherwise suitably fastened in place and may then be cut to desired size and shape.

5 is a flexible blade, preferably a hollow, tapered member of fiberglass or the like. This blade both because it is made of a material, whatever it may be, very much more flexible than the handle core and because it is tapered from end to end is very much more flexible than is the handle assembly. This tapered blade is socketed in the counterbore and is of maximum diameter at the base of the bore. Being tapered, the clearance between the outer wall of the blade and the inner wall of the counterbore increases from the bottom of the counterbore to the outer end thereof. The blade in assembly is held concentric with the handle core and cemented in position in the counterbore. Thus the sleeve of adhesive material 10 encircling the blade and filling the space between it and the inner peripheral wall of the counterbore increases in thickness from the bottom to the open end of the counterbore and thus the tapered blade is rigidly held in position in the stiff handle core.

6 is a front handle sleeve which encircles the blade itself and seats snugly thereon immediately in front of the forward end of the core.

I have not disclosed in detail the reel base and the means for fastening the reel to it as those are conventional and form no part of the present invention.

The important result accomplished by my invention is that the fisherman holding the base handle in one hand and the forward handle sleeve in the other hand, with the reel between both hands has a stiff, rigid member between his hands from which there projects the relatively flexible blade. It is of the utmost importance that the two elements held by the hands of the fisherman as he manipulates the flexible blade be so stiff and so rigid that there is no appreciable give between the two points at which he holds the rod and the flexibility and spring is concentrated in the flexible blade extending forwardly from the rigid handle. This is accomplished by the fact that the handle itself is of such size and such material that there is no appreciable distortion of the handle whereas the blade is of such material that it is relatively of great flexibility.

While the handle and blade may be of different materials, it is preferred that the handle core be of wood and the blade be of fiberglass as experience teaches that this combination is an ideal one.

The reel base or ferrule, preferably extends slightly beyond the end of the handle core so that the forward handle sleeve abutting as it does against the end of the handle core interlocks with the reel base.

A suitable blade for my purpose is a tapered, hollow tube made up of fiberglass cloth wound about a tapered mandrel which after the plastic has been baked is withdrawn, though other tapered blades may be used.

The important thing is that as the fisherman uses the rod to cast the bait or lure and later uses the rod in playing the fish, it is of the utmost importance that the handle area between the right and left hands be of maximum rigidity and stiffness and it is of the utmost importance that the blade where it projects beyond the blade handle be flexible and whip-like.

I claim:

1. In a fishing rod, a relatively stiff, cylindrical handle core of uniform outside diameter from end to end, one end only of the core being cylindrically counterbored, the counter-bore being concentric with the core, a cylindrical reel seat encircling and reinforcing the counterbored end of the core and extending from a point adjacent the bottom of the counter-bore to a point slightly beyond the counterbored end of the core, a butt handle carried by the solid end of the core and extending from the butt end thereof to the reel seat, the reel seat where it extends beyond the counterbored end of the core defining with the core an annular pocket encircling the counter-bore, a flexible blade tapered from end to end, socketed in and resting on the bottom of the counter-bore, a sleeve of adhesive material filling the clearance between the opposed surfaces of counter-bore and blade, the radial thickness of the sleeve increasing from the bottom of the counter-bore toward the end of the core, a forward handle encircling the blade, abutting against the core and socketed at its inner end in said annular pocket.

2. In a fishing rod, a relatively stiff, cylindrical handle core of uniform outside diameter from end to end, one end only of the core being cylindrically counterbored, the counter-bore being concentric with the core, a cylindrical reel seat encircling and reinforcing the counterbored end of the core and extending from a point adjacent the bottom of the counter-bore to a point adjacent the counterbored end of the core, a butt handle carried by the solid end of the core and extending from the butt end thereof to the reel seat, the reel seat where it extends beyond the counterbored end of the core defining with the core an annular pocket encircling the counter-bore, a flexible blade tapered from end to end, socketed in and resting on the bottom of the counter-bore, a sleeve of adhesive material filling the clearance between the opposed surfaces of counter-bore and blade, the radial thickness of the sleeve increasing from the bottom of the counter-bore toward the end of the core, a forward handle encircling the blade, abutting against the counterbored end of the core.

3. In a fishing rod, a relatively stiff, cylindrical handle core of uniform outside diameter from end to end, one end only of the core being cylindrically counterbored, the counter-bore being concentric with the core, a cylindrical reel seat encircling and reinforcing the counterbored end of the core and extending from a point adjacent the bottom of the counter-bore to a point adjacent the counterbored end of the core, a butt handle carried by the solid end of the core and extending from the butt end thereof to the reel seat, the reel seat where it extends beyond the counterbored end of the core defining with the core an annular pocket encircling the counterbore, a flexible blade tapered from end to end, socketed in and resting on the bottom of the counter-bore, a sleeve of adhesive material filling the clearance between the opposed surfaces of counter-bore and blade, the radial thickness of the sleeve increasing from the bottom of the counter-bore toward the end of the core.

References Cited in the file of this patent

UNITED STATES PATENTS

| | | |
|---|---|---|
| 1,013,333 | Tredwell | Jan. 2, 1912 |
| 1,961,970 | Heddon | June 5, 1934 |
| 2,145,612 | Scogland et al. | Jan. 31, 1939 |